United States Patent [19]

Nishimura et al.

[11] 4,378,153

[45] Mar. 29, 1983

[54] ELECTRONIC DUPLICATOR

[75] Inventors: Fuminobu Nishimura, Yokohama; Mitsuaki Kohyama, Higashi-Kurume, both of Japan

[73] Assignee: Tokyo Shibaura Denki Kabushiki Kaisha, Kawasaki, Japan

[21] Appl. No.: 260,400

[22] Filed: May 4, 1981

[30] Foreign Application Priority Data

May 9, 1980 [JP] Japan .................................. 55-60533

[51] Int. Cl.³ ........................ G03G 15/00; G03B 27/00

[52] U.S. Cl. ........................................ 355/3 R; 355/1; 355/14 R; 354/56; 354/60 L

[58] Field of Search .............. 355/3 R, 14 R, 1, 14 E, 355/8; 350/96.25; 354/56, 60 L

[56] References Cited

U.S. PATENT DOCUMENTS 4,095,888 6/1978 Kawazu et al. .................... 355/1 X
4,172,646 10/1979 Matsumoto ......................... 355/1 X
4,178,093 12/1979 Yanagawa et al. ................. 355/1 X
4,193,679 3/1980 Mochizuki et al. ..................... 355/1
4,200,391 4/1980 Sakamoto et al. ................ 355/14 E

*Primary Examiner*—A. C. Prescott
*Attorney, Agent, or Firm*—Cushman, Darby & Cushman

[57] ABSTRACT

Disclosed is an electronic duplicator having a focusing light transmitting body, which includes optical fiber tubes for image formation and optical fiber tubes for detecting the image density. The image density detection optical fiber tubes effect the measurement of the dose of light reflected by the document before the image formation by the image formation optical fiber tubes with respect to the advancement of a document table. The information of the measured value is supplied to an exposure control section and a bias voltage control section for appropriate exposure and bias voltage control.

1 Claim, 5 Drawing Figures

ELECTRONIC DUPLICATOR

BACKGROUND OF THE INVENTION

This invention relates to electronic duplicators which can detect the dose of light reflected from an original document and responsively adjust to obtain the corresponding desirous copying results.

The quality of the image obtained with recent electronic duplicators has been increasing. This is attributable to the improvement of the material of the photosensitive drum and toner and mechanical improvement such as those concerning, for instance, the distance between the photosensitive drum and developing device at the time of the development that have been made for improving the image quality.

Recently, automatic exposure devices having the function of permitting the self-diagnosis of the image density of the document by the electronic duplicator itself have been developed.

In such an automatic exposure apparatus, the image density of the document to be copied is detected, and the desired copying results are obtained by varying the illumination intensity (hereinafter also referred to as exposure dose) of the exposure light source so that an image of the corresponding proper image density can be obtained or varying the voltage applied to the photosensitive drum or the bias voltage supplied to the developing device.

Hitherto, it has been in practice to detect the image density of the document by providing a section of illuminating the document and a section for detecting the reflected light. By this method, however, the light dose provided by the illuminating section is likely to be insufficient, and extremely high cost is necessary to provide the necessary light dose.

Further, some electronic duplicators of the light transmitting type or light reflecting type incorporate an element, which detects the image density of the document by detecting light from the document, on the light axis between the document provided in a lens housing section and a photosensitive member. However, while this method is effective for large size electronic duplicators having a large lens housing section, it cannot be adopted in small size electronic duplicators for the lens housing section is too large in size for these duplicators and cannot be reduced.

SUMMARY OF THE INVENTION

An object of the invention is to provide an electronic duplicator, which can obviate the above drawbacks and is capable of detecting fine portions of the document to obtain a copy of high image quality as well as being very simple in construction and highly reliable.

To achieve this object, the electronic duplicator according to the invention comprises a photosensitive member, charging means for forming an electrostatic latent image on the photosensitive member, projecting means for projecting the light image of a document on the photosensitive member through a focusing light transmitting body, and developing means for developing the electrostatic latent image to form a toner image by supplying toner to the photosensitive member, wherein the focusing light transmitting body is constituted by optical fiber tubes for image formation and optical fiber tubes for detection of the image density, these optical fiber tubes being arranged such that the document reaches the image density detection optical fiber tubes before it reaches the image formation optical fiber tubes.

Since with the electronic duplicator according to the invention the exposure dose is controlled through the detection of light reflected by the document using the focusing light transmitting body, a resolution in excess of 4 lines per mm can be obtained at the focal position. Thus, it is possible to detect accurate image density distribution of the document and set the optimum exposure light dose according to the detected document image density information, so that high quality image can always be obtained. The invention is particularly effective for small character documents such as newspaper and dictionaries and also photograph documents.

BRIEF DESCRIPTION OF THE DRAWINGS

The above and other objects and features of the present invention will be apparent from the following description taken in connection with the accompanying drawings, in which.

DETAILED DESCRIPTION OF THE PREFERRED EMBODIMENTS

Figure 1:
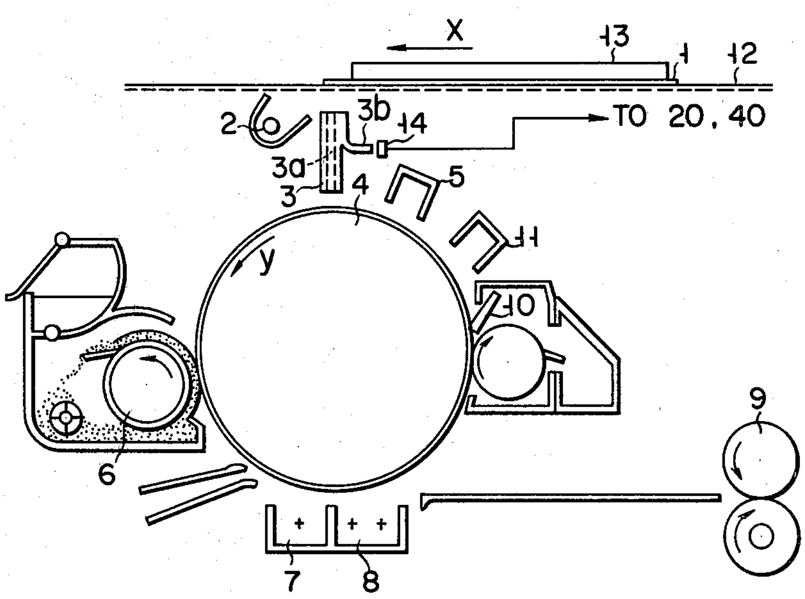
FIG. 1 is a schematic view showing an electronic duplicator embodying the invention.
Figure 2:
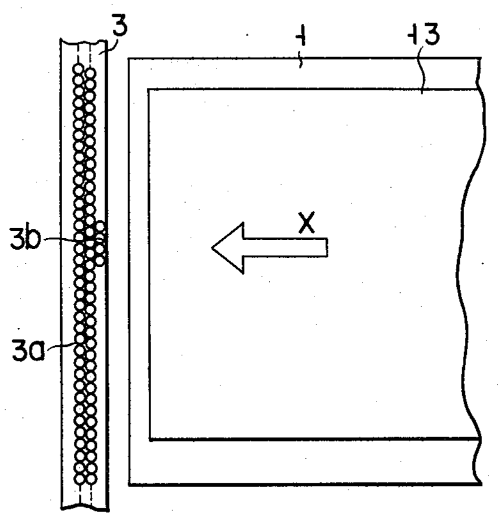
FIG. 2 is a plan view showing a focusing light transmitting body in the embodiment shown in FIG. 1.

Referring now to FIGS. 1 and 2, a document table 1 for supporting a document is reciprocably movable in the direction of arrow X when desired. As the document support 1 is moved forward, the document supported thereon passes over a light source (i.e., exposure lamp). Thus, the image of the document is illuminated by the exposure lamp 2, and light reflected by the document is led through a focusing light transmitting member 3 to a photosensitive drum 4, whereby the light image of the document (i.e., image to be copied) is focused on the drum 4. The drum 4 is rotated in the direction of arrow Y, and as it is rotated it is first charged by a charger 5 and is then exposed to the document image for forming an electrostatic latent image on its surface. The electrostatic latent image thus formed is developed by a developer (i.e., toner) into a visible image as the drum is moved past a developing device 6. Meanwhile, a copying sheet which is accommodated in copying sheet accommodating section such as a cassette is fed out by a feed roller (not shown) operated with the rotation of the drum 4 and transferred by a transfer roller (not shown). The copying sheet being transferred is brought into close contact with the surface of the drum 4 at a position in the proximity of a transfer charger 7, whereby the developed image on the drum 4 is transferred onto the copying sheet by the charger 7.

After the transfer, the copying sheet is peeled off from the surface of the drum 4 by a peel-off charger 8 and then transferred to a fixing device 9 whereby the transferred image is thermally fixed. After the fixing, the copying sheet is discharged from an outlet by a discharge roller (not shown).

Meanwhile, after the transfer the photosensitive drum 4 is cleaned by a cleaning brush 10 and then discharged by a discharger 11 to recover the initial state.

The optical system which makes use of the focusing light transmitting body 3 will now be described in further detail. In the copying section, a document is placed, image side down, between the document table 1 which is moved in the direction shown in FIG. 1 and a document retainer 13 integral with the table. Together with the rotation of the photosensitive drum 4, the document table 1 to the left (i.e., in the direction of arrow X in FIG. 1) is moved at the same speed as the peripheral speed of the drum 4, and the exposure light source 2 is turned on to illuminate the copying section of the document on the document table 1. Light reflected by the document is led through the focusing light transmitting body 3 shown in FIG. 1 to the photosensitive drum 4 to form an electrostatic latent image thereon. As the focusing light transmitting body 3 may be used, for instance, a self-focusing fiber lens ("Selfoc lens" a trade name).

The focusing light transmitting body 3 has a number of parallel image formation optical fiber tubes 3*a* arranged in a direction perpendicular to the direction of movement of the document table. Some of the optical fiber tubes 3*a* constituting the focusing light transmitting body 3 are used for detecting the image density. The image density detection optical fiber tubes 3*b* are bent sidewise, and a light detecting element 14 is disposed to face the end of the bent portion of each image density detection optical fiber tube 3*b*. The detection signal from the light detecting element is supplied to an exposure control section 20 and a bias voltage control section 40 to be described later for controlling the exposure light dose of the light source 2 and the bias voltage applied to the developing unit 6.

With this arrangement, the image density detection optical fiber tubes 3*b* effects the detection of the dose of light reflected by the document prior to the image formation by the image formation optical fiber tubes 3*a* with respect to the advancement of the document table 1 (in the direction of arrow X). The output of the light detecting element 14 is supplied to the exposure control section 40 for controlling the light dose of the exposure light source 2 according to the output of the exposure control section 20. By so doing, proper exposure can be obtained when the document passes over the image formation optical fiber tubes 3*a*, and also a proper bias voltage can be provided for the developing unit 6. The signal from the detecting element 14 corresponding to the output of the image density detection optical fiber tubes 3*b* is adapted to be detected as divisions in the direction perpendicular to the direction of progress of the image. (This method of taking out the signal is not limitative, and it is possible to adopt various ways of taking out the signal.)

Also, while in the above electronic duplicator the document is moved while the light source is held stationary, this is by no means limitative, and the invention is also applicable to an electronic duplicator where the document is held stationary and the light source is moved.

Figure 3:
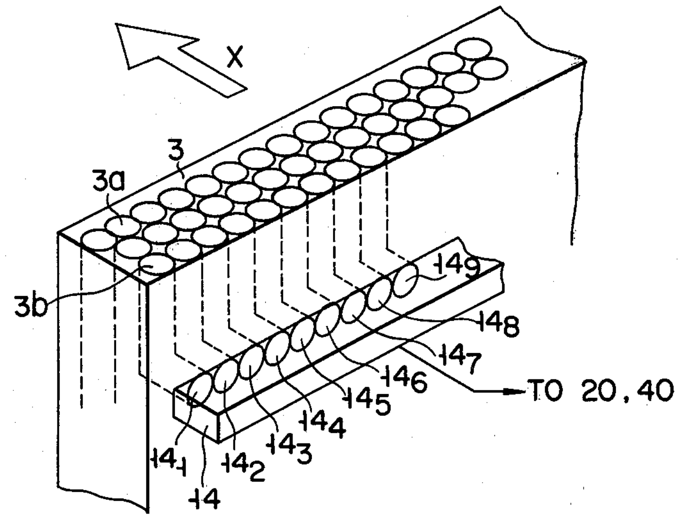
FIG. 3 is a perspective view showing a different embodiment of the invention.

FIG. 3 shows a different embodiment of the invention. In this embodiment, a plurality of image density detection optical fiber tubes 3*b* of the focusing light transmitting body 3 are arranged in a row such that they extend in the direction of progress of the image, and the range of the detection is made variable according to the size of the document. Thus, when producing a copy of a document of a small size, more proper exposure can be obtained through the detection of the document size to produce a copy matched to the document density; for example, when producing a copy of a document of the size corresponding to the interval covering the ends $14_1$ to $14_9$ of the image density detection optical fiber tubes 3*b*, the exposure control is effected through the detection of a signal corresponding to this original size.

In this case, for controlling the signal detection region, the light detecting element 14 is divided into blocks such that different numbers of blocks correspond to different document sizes. Alternatively, it is possible to permit the control to be effected by appropriately blocking the space between the light detecting element 14 and image density detection optical fiber tubes 3*b* by suitable means.

Figure 4:
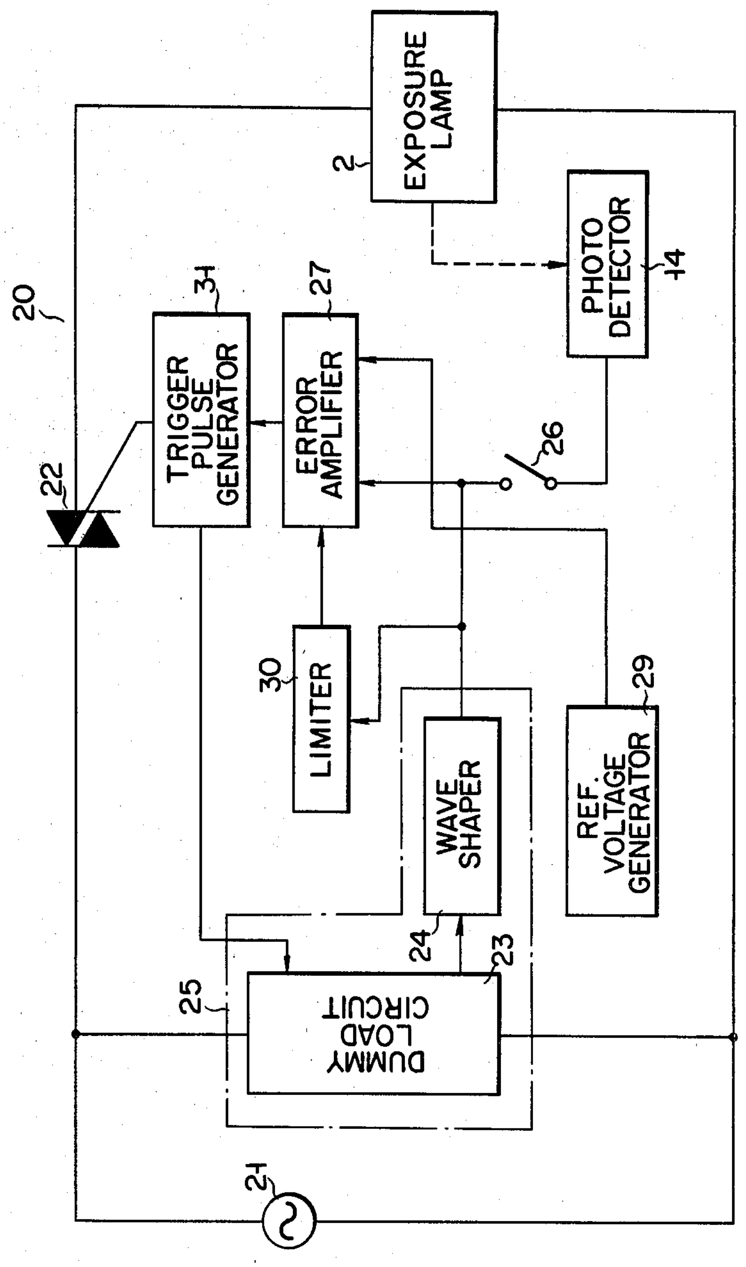
FIG. 4 is a block diagram showing an exposure control circuit used in the embodiment of FIGS. 1 and 3.

FIG. 4 shows the detailed block diagram of the exposure control section used in the embodiment of FIG. 3. The exposure lamp 2 is connected in series with a bilateral thyristor 22 across a commercial alternating current power source 21. A dummy load circuit 23 is connected across the power source 21. When the thyristor 22 is "on," the dummy load circuit 23 applies a voltage corresponding to the voltage between the opposite terminals of the exposure lamp 2 across the dummy load circuit 23. The output voltage of the dummy load circuit 23 is supplied to a waveform shaper 24. The waveform shaper 24 shapes the waveform of the output voltage of the dummy load circuit 33 to provide a voltage corresponding to the effective voltage of the exposure lamp 2. The dummy load circuit 23 and waveform shaper 24 form a voltage generating circuit 25 for generating a voltage corresponding to the voltage applied to the exposure lamp 2. The output voltage of the waveform shaper 24 is supplied to a comparator, for instance an error amplifier 27, to which the output voltage of the light detecting circuit 14 is also supplied through a summing switch 26. The error amplifier 27 compares the output voltage of the waveform shaper 24 or the sum of this voltage and the output voltage of the light detecting circuit 14 and the reference voltage output of a reference voltage generating circuit 29 and, if there is a difference between these voltages, provides a signal corresponding to the difference. The light detecting circuit 14 detects light reflected from the original and provides a voltage signal corresponding to the detected light dose. A limiter 30 is connected to the error amplifier 27. It serves to limit the voltage applied to the exposure lamp 2 to be within a rated voltage by controlling the output of the error amplifier 27 when the output voltage of the waveform shaper 24 exceeds a predetermined value. The output of the error amplifier 27 is supplied to a trigger pulse generator 31. The trigger pulse generator 31 generates a trigger pulse in synchronism with the frequency of the power source 21, and the phase of generation of the trigger pulse is controlled according to the output signal from the error amplifier 27. The controlled trigger pulse is supplied to the gate of the thyristor 22. When the summing switch is "off," the exposure lamp 2 is controlled only by the output voltage of the voltage generating circuit 25. For example, when there is a difference between the output voltage of the waveform shaper 24 and the reference voltage from the reference voltage generating circuit 29, the output voltage error amplifier 27 is changed according to the magnitude of the error, and the phase of generation of the trigger pulse from the trigger pulse generating circuit 31 is changed accordingly. In consequence, the conduction angle of the thyristor 22 is changed, and this change is fed back to the error amplifier 27 as the trigger pulse to the dummy load circuit 23. Thus, the circuit as a whole functions to control the output voltage of the waveform shaper 24 to be equal to the reference voltage from the reference voltage generating circuit 29, i.e., to make the voltage applied between the opposite terminals of the exposure lamp 2 constant regardless of the voltage fluctuations of the power source 21. The limiter 30 detects the output voltage of the waveform shaper 24, and it limits the output of the error amplifier 27 when the output voltage of the waveform shaper 24 exceeds a predetermined value.

When the summing switch 26 is turned on, the exposure lamp 2 is controlled by the output voltages of the voltage generating circuit 25 and light detecting circuit 14. Light from the exposure lamp 2 is reflected by the document is incident upon the light detecting circuit 14, which provides an output voltage according to the incident light dose, this output voltage being supplied through the summing switch 26 to the error amplifier 27. At this time, the voltage generating circuit 25 provides a predetermined voltage in the manner as described previously, and the output voltage of the light detecting circuit 14 is supplied to in superimposition upon the output voltage of the voltage generating circuit 25 to the error amplifier 27. If the output voltage of the light detecting circuit 14 is such that it is low when the input light dose is low, with a document of a thicker or darker ground surface light reflected by the document, i.e., the dose of light incident on the light detecting circuit 14, is less so that the output voltage of the light detecting circuit 14 is lower. If the sum of the output voltage of the voltage generating circuit 25 and the output voltage of the light detecting circuit 14 is lower than the reference voltage of the reference voltage generating circuit 29, the error amplifier 27 amplifies the difference, and the amplified difference output is fed to the trigger pulse generator 31. Thus, the trigger pulse generator 31 controls the thyristor 22 to increase the conduction angle thereof for increasing the light dose of the exposure lamp 2. Subsequently, the light dose of the exposure lamp 2 is detected again by the light detecting circuit 14, and the output voltage thereof is supplied in superimposition upon the output voltage of the voltage generating circuit 25 to the comparator for comparison with the reference voltage, whereby the sum voltage eventually becomes equal to the reference voltage. In this state, if the voltage of the power source 21 is changed, the balance mentioned above is lost, thus causing the operation as mentioned to maintain the voltage applied to the exposure lamp 2 constant.

It will be understood that the circuit as a whole effects control such as to maintain the voltage applied to the exposure lamp 2 constant and also maintain the dose of light reflected from the document constant, so that it is possible to always obtain the optimum exposure irrespective of the fluctuations of the power source voltage and the image density of the document. Further, since it is the light reflected from the document that is detected, it is possible to provide for compensation for the fluctuations of the power source voltage.

Figure 5:
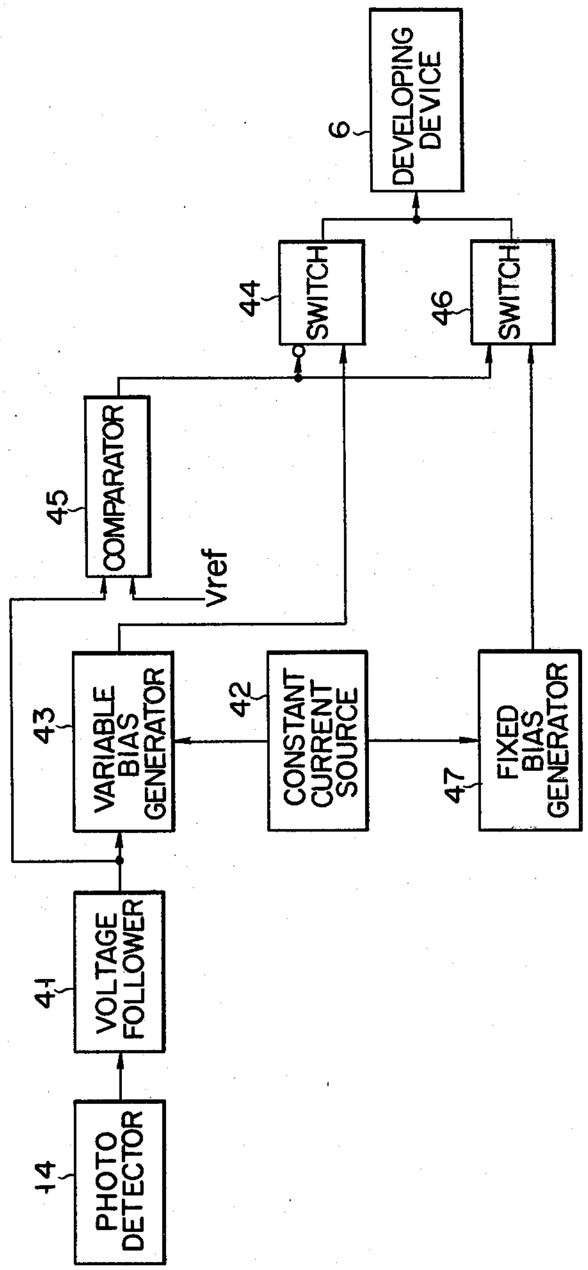
FIG. 5 is a block diagram showing the detailed construction of the bias control circuit used in the embodiment of FIGS. 1 and 3.

FIG. 5 shows a bias voltage control section 40 used in accordance with the invention. The aforementioned light detecting circuit 14 is connected through a unity gain voltage follower 41 which offers a high input impedance of $10^{11}$ to $10^{12}\ \Omega$ to a variable bias voltage generator 43 driven by a constant current source 42. The variable bias voltage generator 43 provides an output voltage which is equal to the output voltage of the light detecting circuit 14 and equal to or slightly higher than the average electrostatic potential on the photosensitive drum 4. The output of the variable bias voltage generator 43 is coupled to an electronic switch 44. The output of the voltage follower 41 is also coupled to one input terminal of a comparator 45, and a reference voltage $V_{ref}$ corresponding to the electrostatic potential $V_1$ on the photosensitive drum 4 is coupled to the other input terminal of the comparator 45. The output of the comparator 46 is coupled to a non-inverted control input terminal of the switch 46. A fixed bias generator 47 is energized by the constant current source 42 and provides a constant bias voltage which is coupled to the other input terminal of the switch 46. The outputs of the switches 44 and 46 are coupled to the developing device 6. When the output voltage of the voltage follower 41 becomes lower than the aforementioned reference voltage $V_{ref}$, the comparator 45 provides a low level output to close the switch 44 and open the switch 46. Thus, the output of the variable bias voltage generator 43 is coupled through the switch 44 to the developing device 6. This bias voltage is increased to its upper limit, which is obtained when the aforementioned electrostatic potential is equal to $V_1$ and the output of the voltage follower 41 is equal to $V_{ref}$. When the voltage mentioned above exceeds $V_1$, the output of the comparator 45 goes to a high level to open the switch 44 and close the switch 46. In this way, the output of the constant bias voltage generator 47 is coupled to the developing device 6. Similarly, the aforementioned bias voltage is held at $VB_2$ (100 VDC) with respect to all the electrostatic image potential values above $V_1$.

What we claim is:

1. An electronic duplicator comprising:
   means for retaining a document to be duplicated;
   a photosensitive member,
   charging means for electrostatically charging said photosensitive member,
   projecting means for projecting an image of said document onto said photosensitive member to form an electrostatic latent image of said document thereon, said projecting means comprising a focusing light transmitting member;
   means for obtaining relative movement between said document and said projecting means; and
   developing means for supplying toner to said photosensitive member and developing said electrostatic latent image to form a toner image,
   said focusing light transmitting member comprising a first set of optical fiber tubes for image formation which are arranged in at least one row and a second set of optical fiber tubes for image density detection which are arranged in at least one row, each of said sets of optical fiber tubes comprising a plurality of focusing optical fibers,
   said sets of optical fiber tubes being arranged in parallel array such that a document moved relative to said projecting means reaches said image density detection optical fiber tubes before it reaches said image formation optical fiber tubes.

* * * * *